(12) United States Patent
Sivan et al.

(10) Patent No.: US 9,064,426 B2
(45) Date of Patent: Jun. 23, 2015

(54) METHOD AND DEVICE FOR TACTILE PRESENTATION

(75) Inventors: Uri Sivan, Haifa (IL); Elad Brod, Tivon (IL)

(73) Assignee: Technion Research & Development Foundation Limited, Haifa (IL)

( * ) Notice: Subject to any disclaimer, the term of this patent is extended or adjusted under 35 U.S.C. 154(b) by 1254 days.

(21) Appl. No.: 12/934,658

(22) PCT Filed: Mar. 25, 2009

(86) PCT No.: PCT/IL2009/000336
§ 371 (c)(1),
(2), (4) Date: Sep. 27, 2010

(87) PCT Pub. No.: WO2009/118736
PCT Pub. Date: Oct. 1, 2009

(65) Prior Publication Data
US 2011/0025602 A1 Feb. 3, 2011

Related U.S. Application Data

(60) Provisional application No. 61/039,277, filed on Mar. 25, 2008.

(51) Int. Cl.
*H04B 3/36* (2006.01)
*G09B 21/00* (2006.01)
(52) U.S. Cl.
CPC .................................. *G09B 21/003* (2013.01)
(58) Field of Classification Search
USPC .................... 340/407.1, 407.2; 434/113, 112; 257/40; 359/245, 265
See application file for complete search history.

(56) References Cited

U.S. PATENT DOCUMENTS

| 5,580,251 A * | 12/1996 | Gilkes et al. ................... 434/113 |
| 2002/0171081 A1 | 11/2002 | Vincent et al. |
| 2003/0179432 A1 | 9/2003 | Vincent et al. |
| 2007/0247700 A1* | 10/2007 | Makowski ..................... 359/322 |

FOREIGN PATENT DOCUMENTS

| CN | 1688923 | 10/2005 |
| DE | 19912307 | 9/2000 |

(Continued)

OTHER PUBLICATIONS

Kim et al ("Bending behavior of hydrogels composed of poly (methacrylic acid) and alginate by electrical stimulus") {Polymer International, Society of Chemical Industry, GB, pp. 1456-1460,XP009122395,ISSN: 0959-8103, Oct. 1, 2004 (IDS submitted on Oct. 31, 2010)}.*

(Continued)

*Primary Examiner* — Vernal Brown
*Assistant Examiner* — Hongmin Fan

(57) ABSTRACT

A method for a tactile presentation of perceivable content. The method comprises receiving a data representing perceivable content, selecting a plurality of electric currents according to the data, each the electric current is associated with at least one of a plurality of regions of a solution having a plurality of macromolecules, and changing a level of acidity (pH) of at least one of the plurality of regions by applying a respective the electric current thereto. A proton concentration in the plurality of regions tactilely presents the perceivable content.

19 Claims, 4 Drawing Sheets

(56) References Cited

FOREIGN PATENT DOCUMENTS

| DE | 10226746 | 12/2003 |
|---|---|---|
| DE | 102004061731 | 7/2006 |
| WO | WO 2006/0128825 | 12/2006 |
| WO | WO 2009/118736 | 10/2009 |

OTHER PUBLICATIONS

Response Dated Oct. 5, 2011 to Communication Pursuant to Article 94(3) EPC of Mar. 28, 2011 From the European Patent Office Re. Application No. 09723852.1.
Translation of Office Action Dated Nov. 5, 2012 From the State Intellectual Property Office of the People's Republic of China Re. Application No. 200980119103.7.
Translation of Search Report Dated Nov. 5, 2012 From the State Intellectual Property Office of the People's Republic of China Re. Application No. 200980119103.7.
Communication Pursuant to Article 94(3) EPC Dated Mar. 28, 2011 From the European Patent Office Re. Application No. 09723852.1.
Summons to Attend Oral Proceedings Pursuant to Rule 115(1) EPC Dated Jul. 25, 2012 From the European Patent Office Re. Application No. 09723852.1.
Communication Relating to the Results of the Partial International Search Dated Oct. 8, 2009 From the International Searching Authority Re.: Application No. PCT/IL2009/000336.
International Preliminary Report on Patentability Dated Oct. 7, 2010 From the International Bureau of WIPO Re. Application No. PCT/IL2009/000336.
International Search Report and the Written Opinion Dated Dec. 11, 2009 From the International Searching Authority Re.: Application No. PCT/IL2009/000336.
Kim et al. "Bending Behavior of Hydrogels Composed of Poly(Metacrylic Acid) and Alginate by Electrical Stimulus", Polymer International, Society of Chemical Industry, XP009122395, 53: 1456-1460, Oct. 1, 2004.
Taylor et al. "Advances in an Electrorheological Fluid Based Tactile Array", Displays Devices, XP004128263, 18: 135-141, May 15, 1998. Sections 1, 2.

* cited by examiner

METHOD AND DEVICE FOR TACTILE PRESENTATION

RELATED APPLICATION/S

This Application is a National Phase of PCT Patent Application No. PCT/IL2009/000336 having International filing date of Mar. 25, 2009, which claims the benefit of U.S. Provisional Patent Application No. 61/039,277 filed on Mar. 25, 2008. The contents of the above Applications are all incorporated herein by reference.

FIELD AND BACKGROUND OF THE INVENTION

The present invention, in some embodiments thereof, relates to method and system for presentation of data and, more particularly, but not exclusively, to method and system for presentation of data using electrochemical reactions which takes place in a solution.

During the last decade, various dynamic tactile interfaces have been developed. A common dynamic tactile interface is a Braille display that includes an electromechanical device that is connected to a computer by way of a serial or parallel cable. The display consists of a line of electromechanical tactile elements that move up and down to represent the dots of a Braille cell. Braille displays are often combined with other hardware and software to make up an integrated unit. For instance, Braille displays are connected to video monitors to serve as the display unit, and many units incorporate speech output of the screen prompts.

An exemplary electromechanical tactile cell for use in refreshable Braille and/or graphical tactile displays consists of eight piezoelectric reed elements corresponding to eight tactile pins. The necessary electrical connections and driving forces are provided to actuate the reeds, thereby causing the tactile pins to protrude above a tactile surface to allow the Braille character or graphic element to be displayed.

Other electromechanical tactile cells and/or refreshable tactile displays are known. For example U.S. Pat. No. 7,009,595, filed on Feb. 1, 2008, describes an apparatus and a method for extended refreshable tactile graphic display. The apparatus includes an array of pins at a display surface, with pin setting actuators and display surface matrix preferably being separable units. The display matrix is provided by stacked functional layers, functions including temporary pin retention and pin locking.

Another example is described in U.S. Pat. No. 7,018,209 that describes various apparatus and methods for an actuator and display using one or more shape memory springs. A shape memory spring is heated and urges a pin to a first or extended position. The pin may be supported in the first position by a supporting mechanism. The shape memory spring is heated electrically, and in some embodiments under the control of a processor. This apparatus may be used to display information provided in a user interface from a computer program, including text, numerical data, and graphical images.

SUMMARY OF THE INVENTION

According to some embodiments of the present invention there is provided a method for a tactile presentation of perceivable content. The method comprises receiving a data representing perceivable content, selecting a plurality of electric currents according to the data, each the electric current is associated with at least one of a plurality of regions of a solution having a plurality of macromolecules, and changing a level of acidity (pH) of at least one of the plurality of regions by applying a respective the electric current thereto. A proton concentration in the plurality of regions tactilely presents the perceivable content.

Optionally, the changing comprises biasing a plurality of electrodes positioned in the solution for performing the changing.

Optionally, the perceivable content having a spatio temporal pattern; further comprising repeating the changing and tactilely presenting to emulate the temporal pattern.

Optionally, the changing is performed by changing a proton concentration in adjacent to the solution to induce an ion movement therefrom or thereto.

Optionally, the method further comprises displaying the data behind the solution.

Optionally, the changing comprises measuring the pH in each the at least one region and performing the changing according to the measuring.

According to some embodiments of the present invention there is provided an apparatus for a tactile presentation of perceivable content. The apparatus comprises a layer having at least one pH dependent characteristic, a controller configured for receiving a data representing perceivable content and selecting a plurality of electric currents according to the data, and a plurality of electrodes configured for changing a level of acidity (pH) in a plurality of regions of the layer by simultaneously applying the plurality of electric currents thereto. The applying changes the at least one pH dependent characteristic in each the region so that the layer tactilely present the perceivable content.

Optionally, each the electrode is individually controlled by the controller.

Optionally, the layer comprises gel.

Optionally, the layer and the array of electrodes are elastic.

Optionally, the layer and the array of electrodes are sized and shaped according to be dressed on at least one human organ; the perceivable content is a tactile pattern applied on the at least one human organ to induce a tactile sensation.

Optionally, the apparatus further comprises a plurality of flow sensors each configured for detecting a solution flow in a respective of the plurality of regions, the controller is configured for indicating a touch in the respective region in response to the detected solution flow.

Optionally, the layer comprises at least one pH indicator configured for changing its color in each the region when a respective the pH is changed.

Optionally, the apparatus further comprises a plurality of pH sensors each configured for measuring the pH in a respective of the plurality of regions, the controller is configured for adjusting the plurality of electric currents according to the plurality of pH sensors.

More optionally, each the pH sensor is configured for detecting a pressure applied on a respective the region by performing the measuring.

More optionally, the perceivable content is an indication received from an external device communication with the controller.

More optionally, the controller convert the perceivable content to at least one embossment, the plurality of electric currents is selected according to the at least one embossment so that the layer tactilely present the at least one embossment.

Optionally, the plurality of electrodes are arranged in a structure having a pattern selected from a group consisting of a convex pattern, a concave pattern, and a wavy pattern.

Optionally, the apparatus further comprises a screen positioned below the layer and configured for displaying an image pertaining to the perceivable content.

Optionally, the apparatus further comprises an input device positioned below the layer and configured for detecting a pressure applied on the layer during the tactile presentation.

According to some embodiments of the present invention there is provided an apparatus for a tactile presentation of perceivable content in a layer of gel. The apparatus comprises a layer of gel having at least one pH dependent characteristic, a plurality of electrodes, a membrane separating between the gel and the array of electrodes, at least one counter electrode, an electric chamber formed between the at least one counter electrode and the array of electrodes, and a controller configured for receiving a data representing perceivable content and biasing the array of electrodes according to the data to change a proton concentration in the electric chamber. The proton concentration induces, by a passage of ions of the layer via the membrane, a respective proton concentration in the layer so that the layer tactilely presents the perceivable content.

According to some embodiments of the present invention there is provided a data input device that comprises a layer having at least one pH dependent characteristic and having a plurality of addressable regions, a plurality of pH sensors each positioned one of the plurality of addressable regions and configured for detecting a pH change therein, and a controller configured for receiving a notification about the pH change from a respective the pH sensor and forwarding a signal indicative of the pH change to a computing unit. The pH change is brought about by a touch of at least one object a respective the addressable region.

Optionally, the layer comprises at least one pH indicator configured for changing its color in a respective the region in response to the pH change.

According to some embodiments of the present invention there is provided an optical element for changing a display. The optical element comprises a layer having at least one pH dependent characteristic, a controller configured for receiving a data representing a pattern and selecting a plurality of electric currents according to the data, and a plurality of electrodes configured for changing a level of acidity (pH) in a plurality of regions of the layer by simultaneously applying the plurality of electric currents thereto. The applying changes the at least one pH dependent characteristic in each the region so that at least one optical property of the layer is changed.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
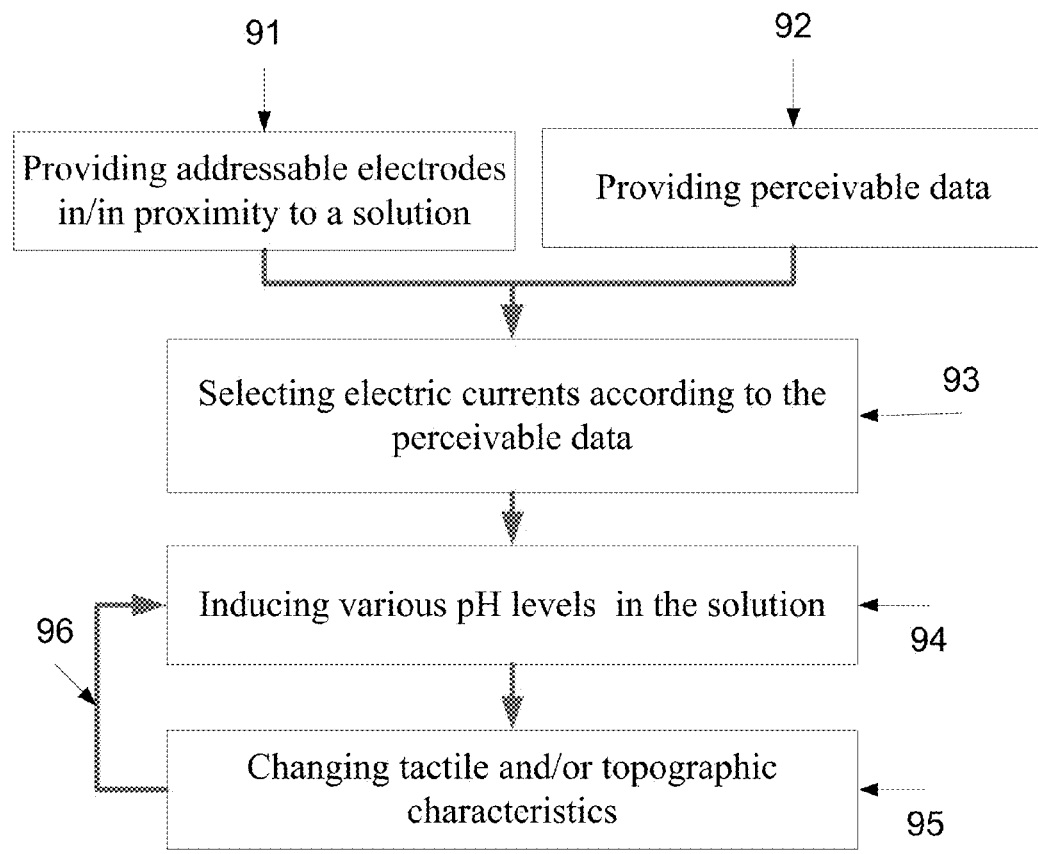
FIG. 1 is a method for tactile presentation of data by a selective control of molecular concentration in a plurality of regions of a solution, according to some embodiments of the present invention.

The present invention, in some embodiments thereof, relates to method and system for presentation of data and, more particularly, but not exclusively, to method and system for presentation of data using electrochemical reactions which takes place in a solution.

According to some embodiments of the present invention there is provided a method and an apparatus for a tactile presentation of a perceivable content, such as images and text, in a solution having pH dependent characteristics. The method is based on data that represents the perceivable content and optionally received from an external unit, such a computing unit of client terminal, such as a cell phone a media player, and/or a personal computer, such as a laptop. Then, electric currents are selected according to the received data, for example by a controller. Each electric current is associated with a region in a layer of a solution, such as a gel. The electric current is applied to the associated region, for example using a selectively addressable electrode. The applying of the electric current changes the level of acidity (pH) of the associated region. In such a manner, the topography of the layer is changed to tactilely present the perceivable content that is represented in the received data. For example, if the data is a word, the controller may generate a set of electric currents that changes the topography of the layer to tactilely present a Braille representation of the word and/or an embossment thereof. In another embodiment the received data includes an image and the topography of the layer to be changed to tactilely present an embossment of the image.

Optionally, the electric currents are applied by an array, such as a two dimensional array of selectively addressable electrodes. Optionally, in order to maintain the topography of the layer, a plurality of pH sensors are connected to the controller. In such an embodiment the pH sensors may provide indications of changes in the pH levels of the regions, allowing the controller to adjust the currents it applies, thereby to renew the topography of the layer to tactilely present the received data.

According to some embodiments of the present invention there is provided a data input device, such as a touch screen. The data input device includes a layer having at least one pH dependent characteristic, such as the layer outlined above. A plurality of pH sensors are positioned in a plurality of addressable regions in the layer, for example a plurality of regions which are positioned above a display, such as an LCD screen. Each pH sensor measures the pH in the associated region and detects pH changes that occur therein. The device further includes a controller that receives notifications from the pH sensor about the pH changes and forwarding accordingly signals to a computing unit. In such a manner, a pH change which is brought about by a touch of one or more objects in one or more of the addressable regions is reported to the computing unit, allowing a user to interact with the device by applying pressure on the layer.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a method for presentation, optionally tactile, of data by a selective control of molecular concentration in a plurality of regions of a solution, such as a gel, according to some embodiments of the present invention. First, as shown at 91, a biasing device that allows applying, optionally selectively and simultaneously, a plurality of electric currents to a plurality of regions of a container that contains a solution, such as gel, is provided. For example, the biasing device may comprise a power supply which is connected an array of selectively addressable electrodes. The array is optionally positioned in or in a solution composed of water and a plurality of macromolecules. Each selectively addressable electrode applies an electric field in and/or in proximity to an adjacent region of the solution. Each one of the electrodes may be separately biased with oxidative or reductive potential.

Figure 2A:
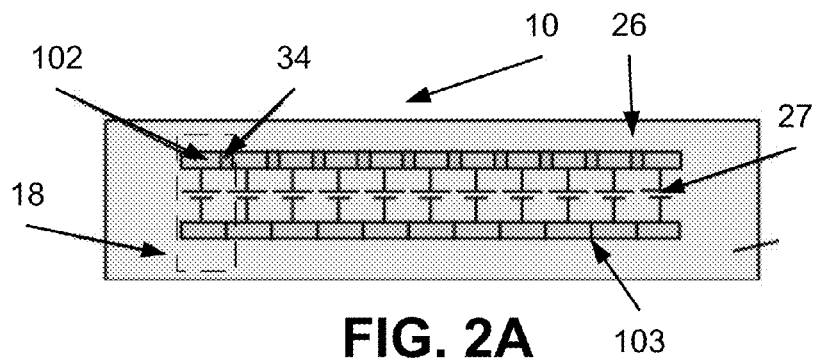
FIGS. 2A and 2B are schematic illustrations of a lateral view and a top view of an exemplary two dimensional array of selectively addressable electrodes, according to some embodiments of the present invention.
Figure 2B:
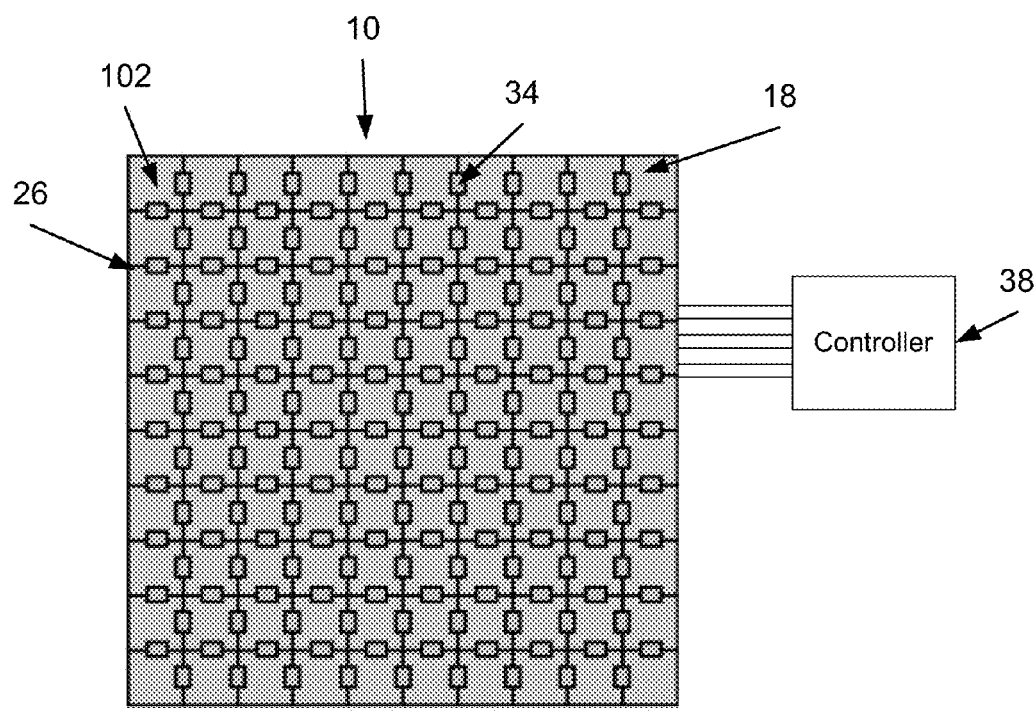

Reference is also made to FIGS. 2A and 2B, which are schematic illustrations of a lateral view and a top view of an exemplary two dimensional (2D) array 26 of selectively addressable electrodes that is positioned in a layer of solution 18, and separately connected to a power source 27, according to some embodiments of the present invention. Optionally, the layer of solution 18 is confined in a flexible container. Each electrode 102 of the array 26 is optionally positioned in an area, optionally bounded, which may be referred to as a cell, a region and/or a pixel 102. The exemplary array 26 that is depicted in FIGS. 2A and 2B consists of a 10×10 matrix of electrodes 102 each selectively energized to change and/or maintain independently the level of acidity (pH) in the region by water electrolysis modulation. Optionally, each working electrode 102 is isolated from the other and biased separately relative to a separate or a common counter electrode 103. Between each two electrodes, a sensor is located to monitor the local pH adjacently to the working electrodes 102. Optionally, each working electrode 102 is separately connected to a controller 38 that is designed for biasing it, separately, with a selected potential.

As shown at 92, data representing perceivable content, referred to herein as perceivable data, such as visual, audible, and/or tactile information and/or stimulation, is provided. As used herein, a perceivable data means an image, a sound, a set of various variables, and/or any other data having one or more dimensions, and can be perceivable by a human or an animal. Such a perceivable data may be digital and/or analog data representing a symbol, a character, a word, a paragraph, an image, a sight, a set of images, such as a video, and/or any other expression. Optionally, the controller 38 receives the perceivable data, for example a word or a character, from a client terminal, such as a personal computer, a thin client, a personal digital assistance (PDA), a Smartphone and/or any other computing unit for processing an image, a symbol, and/or any other perceivable data.

Then, as shown at 93, one or more of the electrodes 102, and optionally a voltage, are selected according to the received perceivable data. Such a selection allows the biasing of the respective regions with oxidative or reductive potential. Optionally, this selection is performed by the controller 38. The controller 38 converts the provided perceivable data to a set of electric currents which are selected to induce, in the layer of solution 18, a tactile presentation of the perceivable data, for example as described below. The biasing of each electrode 102 electrolyzes a region in the solution, thereby changes the pH in it, for example as described below.

In such an embodiment, the controller 38 may automatically convert words and/or characters which are displayed, recorded and/or played by the client terminal to electric currents which are used to create respective topographies that provide respective tactile presentations on the surface of the layer, as further described below. Optionally, the conversion is performed on the client terminal and forwarded to the controller 38.

As shown at 94, such a selective biasing changes the pH level in various regions of the layer of solution 18 according to the provided perceivable data. The changed pH level induces protonation or deprotonation of macromolecules in the solution, causing to a change of one or more tactile and/or topographic characteristics of regions of the solution 18, as shown at 95. As used herein, a tactile and/or a topographic characteristic means a net electric charge, a structure, a rigidity coefficient, a viscosity coefficient, and an elasticity coefficient.

In such embodiments, the selective biasing of the electrodes with various oxidative or reductive potentials causes water electrolysis at the contact area between the electrode and the proximate solution. When the oxidative potential is applied, oxygen gas is formed together with protons as follows:

$$2H_2O \rightarrow O_2 + 4H^+ + 4e^-, \qquad \text{Equation 1}$$

causing a pH decrease near the anode surface.

When the reductive potential is applied, hydrogen gas is formed as follows $$2H_2O + 2e^- \rightarrow H_2 + 2OH^-, \qquad \text{Equation 2}$$

leaving behind hydroxyl ions that recombine with protons in the solution to produce water and thus to increase the local pH. It should be noted that the pH deviation of the solution from a native pH value depends on the buffering capacity and the ionic strength thereof.

The pH affects the protonation of the macromolecules in the solution. In such a manner, the tactile and/or the topographic characteristics may be dynamically controlled. Therefore, by enabling electrically controlled pH modulation, water hydrolysis of the solution allows manipulating biological molecules next to an electrode/solution interface.

Optionally, the solution includes high sodium-chloride concentrations. In such an embodiment, the reaction described in equation 1 is likely to be supplemented with chlorine gas liberation.

When the solution contains protons and hydroxyl ions, their concentration at steady state may be calculated as a position function that is calculated by solving the following Poisson equation:

$$\vec{\nabla} \cdot (\in \vec{E}) = 4\pi e([H^+]-[OH^-]).$$ Equation 3 together with coupled transport equations for the ionic velocities, $\vec{v}_H, \vec{v}_{OH}$ $$\vec{v}_H - \vec{u} = \mu_H \left(\vec{E} - \left(\frac{T}{e \cdot [H^+]}\right)\vec{\nabla}[H^+]\right);$$ Equation 4

$$\vec{v}_{OH} - \vec{u} = \mu_{OH}\left(\vec{E} - \left(\frac{T}{e \cdot [OH^-]}\right)\vec{\nabla}[OH^-]\right).$$

These equations are supplemented by the generation/recombination of the following:

$$\vec{\nabla} \cdot ([H^+]\vec{v}_H) = \vec{\nabla} \cdot ([OH^-]\vec{v}_{OH}) = -\vec{\nabla} \cdot ([H_2O]\vec{u}) = -\Gamma([H^+][OH^-]-K_W),$$ Equation 5 and the proper hydrodynamic equations. In equations 3-5, $\in$ denotes a dielectric constant of water, 78, [quantity] denotes a concentration corresponding to the quantity, $\Gamma$ denotes a proton-hydroxyl recombination rate, $\vec{u}$ denotes the water flow velocity, and $K_W=10^{-14} M^2$ denotes the water equilibrium constant, and $\mu$, T, e respectively denotes mobility, temperature measured in ergs, and the proton electric charge.

Optionally, if the solution includes salts, their ions are taken into account by equations similar to equation 4 as well as by incorporating their contribution to equation 3. Optionally, the equations are adjusted if buffers are added, for example as described below.

It should be noted that in the absence of electric charged boundaries, $\vec{u}$ vanishes except for a small component contributed by a proton-hydroxyl recombination.

The equations may be solved numerically with a set of proper boundary conditions. Linearization of the equations around equilibrium, where the current is zero and net generation/recombination is vanished, yields some relevant length scales of the problem, including a Debye-Huckle screening length (1-10 nm in relevant solutions), a proton-hydroxyl recombination length (up to ~100 nm in neutral solutions), recombination lengths of the buffer components (function of its concentration and pH), and a system related length. Together with the proton and hydroxyl generation rates, these lengths may be tuned by varying the solution's content and electrode arrangement to yield the desired pH pattern.

As described above, the pH in the proximity of the electrodes is controlled by biasing the electrodes with oxidative or reductive potentials. As such, the pH may be changed dynamically, in real time, according to the electric current of the electrodes. Optionally, the time it takes to the pH of a region ranges between 1 second to a few minutes, depending on the geometry of the system.

In such a manner, each working electrode 102 may implement a temporal pH pattern and the array may implement a spatio-temporal pH pattern. These temporal and spatio-temporal pH patterns are used for triggering temporal and spatio-temporal protonation patterns, allowing a tactile presentation of various temporal and spatio-temporal tactile patterns, for example as described below.

For example, as shown at 96, if the provided perceivable data has a tempo-spatial pattern, the selective powering is changed in a plurality of intervals according to the temporal pattern. For example, if the provided perceivable data is a sentence, the tactile and/or topographic characteristics of the regions of the layer 18, for brevity referred to herein as tactile characteristics, may be changed to provide a tactile presentation of the first word. Optionally, the layer 18 includes gel 18 having one or more pH dependent characteristics. Then, the tactile characteristics may be changed to provide a tactile presentation of the second word, and so one and so forth. Optionally, the tactile presentation is provided in Braille signs.

The area of the layer 18 and the array of electrodes 26 determine the amount of data that may be tactilely presented to the user during a single iteration. For example an area of approximately 1 cm long and 1 cm width allows the presentation of tactile information, such as a character that may be felt by a single fingertip of the user. In another example, an area of approximately 10 cm long and 10 cm width allows the presentation of tactile information representing a paragraph or an embossment that is based on visual data, such as a map. Optionally, the device is designed to emulate tactile sensations of an organ. In such embodiments, the area may be adjusted according to the area of the organ that it is designed to stimulate, for example as described below.

According to some embodiments of the present invention, the device receives perceivable data and to generate accordingly a spatial and/or spatio-temporal varying proton concentration patterns, such as varying gradients and/or topographies, is used for tactile presentation of data.

In such an embodiment, the array of selectively addressable electrodes 26 is positioned in the solution 18, which is optionally spread as a layer of a pH-sensitive material, having an electromotive responsive pH property that is tactilely sensible. Optionally, solution 18 comprises a pH-sensitive material having a pH-dependent viscosity, rigidity and/or volume, for example as described in S J Kim, S G Yoon, Y H Lee, S I Kim, Bending behavior of hydrogels composed of poly (methacrylic acid) and alginate by electrical stimulus, Polymer International, 53, 1456-1460 (2004), which is incorporated herein by reference.

Optionally, the layer 18 is coated or substantially coated with a protective layer to protect the pH-sensitive material from impact, wear and/or contamination. For example, the protective layer may be a layer latex rubber, optionally between 0.1 mm and 1.0 mm thick.

Optionally, the received perceivable data defines a spatial pattern, for example as a digital image. The received spatial pattern is translated to a set of electric currents each to one of the electrodes in the array 26. As described above, different electric currents induce pHs in the regions which are adjacent to the electrodes. In such a manner, the electric currents induce the generation of topography or a gradient that is similar, substantially similar, or identical to the spatial pattern that is defined in the received data. Optionally, the received data represents a symbol, such as a character. In such a manner, the device 10, with a 2D array 26, may be used for selectively forming Braille glyphs.

Optionally, each pixel 102 includes a pH sensor 34 for detecting the current pH in or in proximity to the respective electrode of the array 26. Optionally, the pH sensor 34 is an ion sensitive field effect transistor (ISFET) that measures the pH in the proximity thereof, see P. Bergveld Em, "ISFET, Theory and Practice", IEEE Sensor Conference Toronto (2003), which is incorporated herein by reference. In such an embodiment, the voltage that is applied to each electrode 26 may be determined and/or adjusted according to the difference between the measured pH and a desired pH at a respective region. Such a pH sensor functions as a feedback control loop that assures a convergence of the actual pH to the desired value. In some such embodiments, the pH sensor may be used for detecting the user's touch by reversing the aforementioned operating mechanism discussed above. In particular, when one or more regions of the layer 18 are compressed, for example, by the touch of the user's finger or a stylus, the volume of the material inside then decreases. Such a decrease changes the proton dissipation in the layer and the proton concentration in the respective regions. The change affects the pH and therefore detected by the pH sensor 34, similarly to the described above. The detected change is forwarded to the controller 38 that may react to the pH change, for example by forwarding a respective signal to the computing unit of the screen. In such an embodiment, the gel is transparent, so visual information may be presented therethrough.

Additionally or alternately, each pixel or a group of pixels includes a flow sensor for detecting changes in the flow of the solution in proximity thereto. As described above, the layer 18 includes a solution. When a pressure is applied on the layer 18, above the flow sensor, the solution is set in motion. The detection of this motion is indicative of the pressure. Optionally, the intensity of the motion is translated to the intensity of the applied pressure, allowing the flow sensor to distinguish between touches with different applied pressure. For example, the flow sensor is CMOSens® flow sensor which is manufactured by Sensirion, which the specification thereof is incorporated herein by reference.

Optionally, the solution includes pH indicators, such as halochromic chemical compounds so that the pH of the various regions of the solution is indicated by its color. For example, the pH indicators may be Bromophenol Blue having pH range of 3-4.6 and Cresol Red having a pH range of 7.2-8.8.

As described above, a pressure that is applied at a certain region changes the pH therein. In such an embodiment, when a user touches one or more regions, their pH is changes and the pH indicators in the respective region change their color. Such a color change may be used to indicate whether the touch of the user applied sufficient pressure on the layer. In such an embodiment, the pH indicators may be selected in a manner that the solution changes its color in a pH change that is similar to a pH change which is sensed by the aforementioned pH sensors.

Figure 3A:
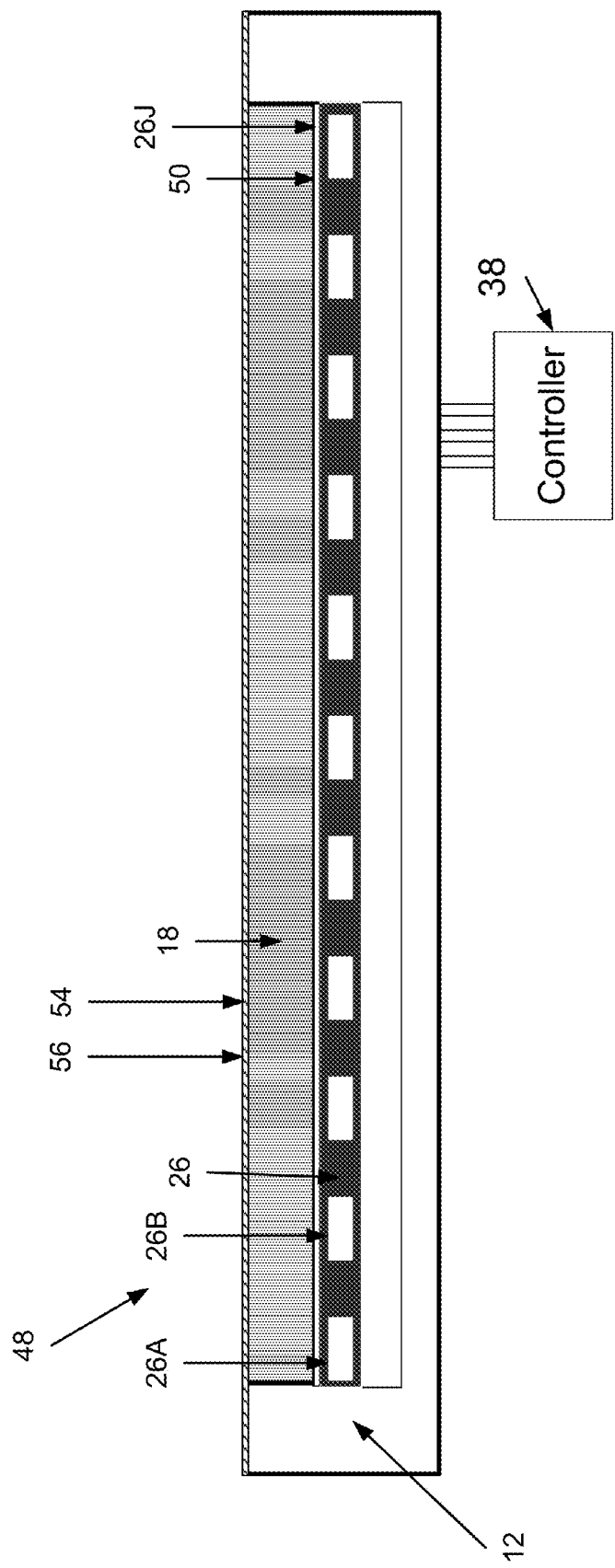
FIGS. 3A and 3B are schematic illustrations of devices of selective tactile presentation of a plurality of spatial or tempo-spatial patterns, according to some embodiments of the present invention.
Figure 3B:
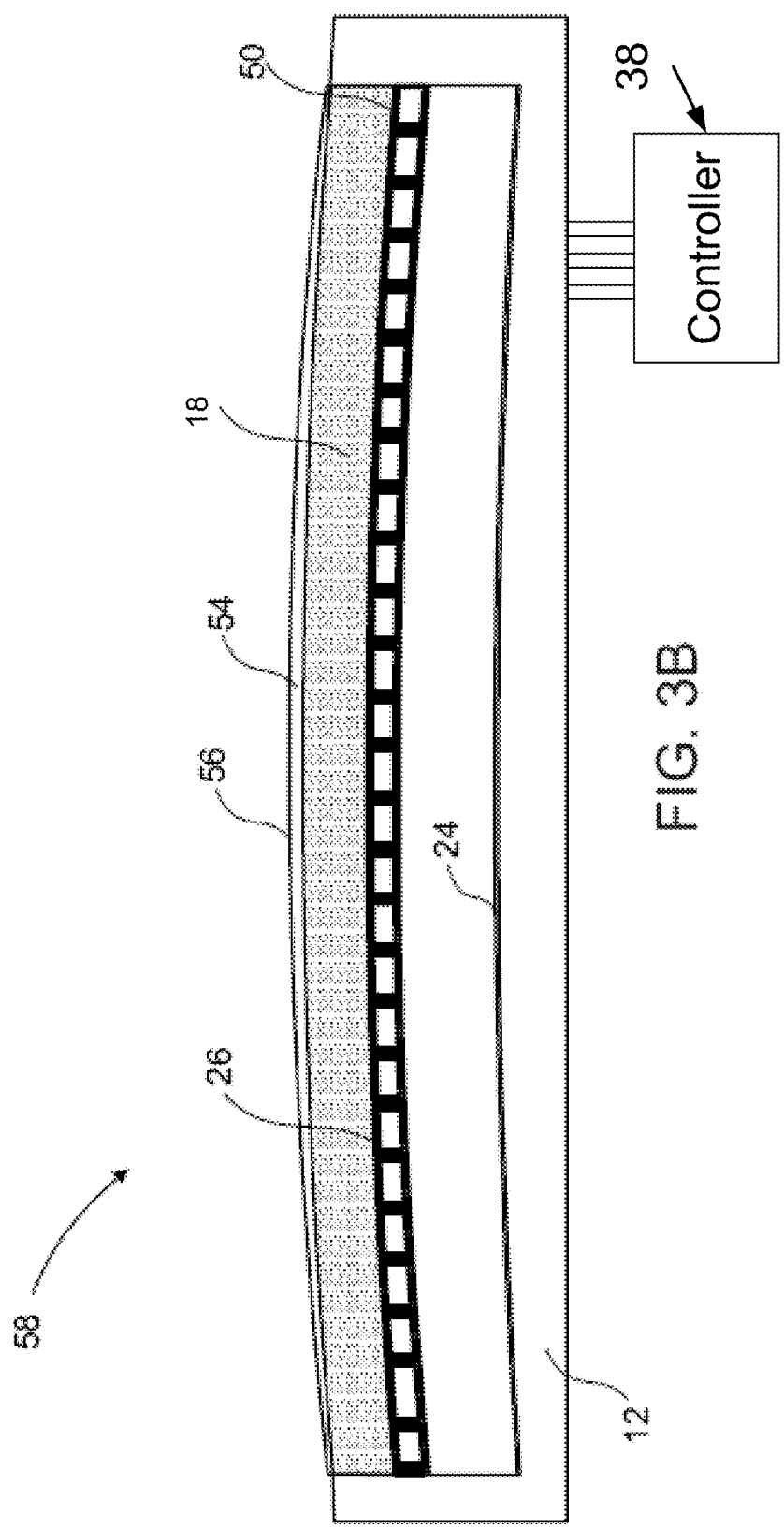

Reference is now also made to FIGS. 3A and 3B which are schematic illustrations of devices of selective tactile presentation of a plurality of spatial or tempo-spatial patterns, according to some embodiments of the present invention. Similarly to the device 10 depicted in FIGS. 2A and 2B, the device 48 comprises the array 26 of the selectively addressable electrodes and the controller 38.

FIG. 3A depicts a lateral view of a dynamic tactile machine-user interface device 48 that comprises a two-dimensional planar array of electrodes 26, a counter electrode 24, and an electrolyte chamber 30. Optionally, the array 26 comprises working electrode arrays, such as mesh electrodes. It should be noted that though the depicted array includes a 27×27 square array of working electrodes 26, any other array of working electrodes 26 may be provided, for example 27×54, 81×81, 512×512 and 1024×256 and/or any other array of electrodes. Optionally, the electrodes are made of platinum or gold. The array 26 is positioned in an exemplary housing 12, below the layer 18, which is optionally a gel having pH-dependent characteristics. The layer 18 is optionally covered by a protective layer 54, as described above. Optionally, a membrane 20 is positioned between the array 26 and the layer 18. The membrane 20 allows substantially free passage of ions and water molecules between layer of gel 18 and the electrolyte chamber 30. Optionally, the membrane 20 is a hydrophilic polyvinylidene fluoride (PVDF) membrane with 5 micrometer pores, for example a Durapore (SVLP04700) membrane of Millipore, Inc. Billerica, Mass., USA, which the specification thereof is incorporated herein by reference. The membrane is positioned to physically support the layer 18 and allows a passage of ions and water molecules between the layer 18 and the electrolyte chamber 30.

The electrode array 26 that is depicted in FIGS. 3A-3B generates a two-dimensional proton concentration topography, which may be understood as the distribution of protons, inside the solution 18. The electrode array 26 is positioned in parallel to a counter electrode 24 that comprises one or more platinum sheets which are mounted in parallel, or substantially in parallel, to the individually controllable working electrodes 26A-26j of the array 26. Optionally, each individually controllable working electrode 26A-26j comprises a conductive mesh, such as a platinum mesh, for example having 0.1 mm thick wires with 0.1 mm gaps. Optionally, each one of the working electrodes 26A-26j is separated from neighboring working electrodes 26A-26j by one or more working electrode separators. Optionally, the working electrode separators are thin glass walls. Working electrodes 26 are separated from membrane 20 by a distance of about 0.5 mm and from counter electrode 24 by about 4 mm.

Optionally, the electrolyte chamber 30 is filled with an electrolyte liquid, for example a solution comprising 0.1M of sodium sulfate ($Na_2SO_4$).

The controller 38 of the device 48 activates the individual working electrodes of electrode array 26 to generate a desired proton concentration topography inside the layer, for example of a character, a symbol, a word and/or a sentence written in Braille, and a simulation of a tactile sensation, for example as described below When the device 10 is used, the electrodes 26 may biased according to the received data. For example, the power supply controller 38 generates a selected current between the counter electrode 24 and each working electrode 26a-26j according to the received instructions. In such a manner, an electro-motive force is generated in the electrolyte chamber 30 between the counter electrode 24 and each one of the working electrode 26a-26j. For example, the selected current may be between 0 and about 5 mA $cm^{-2}$. Optionally, the electro-motive force is between 0V and about 20V. The biasing of the electrodes 26 induces a proton concentration in the electrolyte chamber 30, similarly to the described above. Similarly, to the described above and shown at 94, the pH in each region of the gel 18 in the electrolyte chamber 30 is affected by the biasing of the electrodes 26 with oxidative or reductive potential. In such a manner, the pH in each one of the regions of the gel 18 in the electrolyte chamber 30 may be changed dynamically and separately, in real time, according to the electric charge of an adjacent electrode. This proton concentration induces a passage of ions and water to and/or from the layer of gel 18, changing the proton concentration therein in a respective manner. Different pHs are respectively formed in the regions of the layer 18 and affects the rigidity, viscosity, and/or elasticity coefficients of the regions. In such a manner, a person touching the layer 18 or the protective layer 54 of the device 48 senses the topography of the layer.

FIG. 3B depicts another tactile machine-user interface device 58. The device 58 is similar to the device 48 depicted in FIG. 3A, however, in FIG. 3B the array 26 is convex. It should be noted that the array 26 may be curved in any other manner, for example in a concave pattern, an inclined pattern, and/or a wavy pattern.

In such an embodiment, the device 10 uses the ability to respond to both electrical and tactile stimuli for providing an interactive man machine interface (MMI) to the user, such as an input and output tactile device. The device 10 may convert a local proton concentration on one region into a locally generated proton concentration in the same or another region. The generated proton concentration effect induces a tactile sensible effect, as described above. Such a tactile sensible effect may allow emulating a response of a biological tissue or another element to a human touch.

As described above, the device uses the array 26 of electrodes to electrochemically affect proton concentration in proximity to the layer 18 that is sensitive to this concentration and changes its volume or topography in response. Optionally, the array 26 of electrodes is designed to control a property of the layer that is not related to proton concentration. For example, in some embodiments, the array 26 of electrodes is replaced with a unit that electrochemically releases anions and the layer 18 may include a material sensitive to the anion concentration. For example, the unit may comprise a polypyrrole polymer that releases anions upon electrical stimulation, for example as described in, see WADHWA Reecha et. al., electrochemically controlled release of dexamethasone from conducting polymer polypyrrole coated electrode, Journal of Controlled Release 2006, 110, 531-541, which is incorporated herein by reference and the layer comprises an anionic copolymer gels that swells and contracts under variation of ion concentrations, see Atul R. Khare et. al., Swelling/deswelling of anionic copolymer, Biomaterials 1995, 16, 559-567, which is incorporated herein by reference.

Optionally, the tactile machine-user interface device 10, 48, 58, allows the tactile presentation of data to a user, such as a visually-impaired user, for example by forming Braille alphabet glyphs. Optionally, the tactile machine-user interface device 10, 48, 58, allows the tactile presentation of data to a user that uses a device, such as a camera, a scientific device, and a cell phone, in an area with low-light or low visibility phone.

Optionally, the tactile machine-user interface device 10, 48, 58 allows presenting data to a user without requiring from her to turn her eyes. In such an embodiment, the device 10, 48, 58 may be integrated into a manual control device that is touched by the user, for example a joystick, a touch screen, a button, a keyboard, and a keypad, a cloth worn by the user, and/or any other element that is in contact with the body of the user.

Optionally, the tactile machine-user interface device 10, 48, 58, is designed to emulate a tactile sensation. For example, the tactile machine-user interface device 10, 48, 58, may be used for presenting tactile feedback to a user that participate in a game session or uses an interactive application, for example by integrating the device to the man machine interface (MMI) of a mobile communication device, a gaming console, and personal assistant device.

Optionally, the tactile machine-user interface device 10, 48, 58, is designed to emulate a texture or topography of an element that is displayed to the user, for example in a virtual and/or augmented display.

Optionally, the tactile machine-user interface device 10, 48, 58, is elastic. In such a embodiment, the array of electrodes 26 is made of an elastic material, such as stainless steel or phosphor bronze, that allows the bending thereof according to various curvatures, for example according to the human contours. In such an embodiment, the device may be a wearable device, such as a glove, a sleeve, a shirt, pants, a hat, and/or any other apparel. In such an embodiment, the perceivable data may be tactile sensations, such as roughness, textures, vibration pressure, itching and friction. The sensations may emulate the touch of elements and/or organs and/or bodily reactions. Optionally, the perceivable data is a spatiotemporal pattern of a tactile sensation, such as human touch. For example, if the device is a sleeve, the rigidity and elasticity of the various regions may be sequentially changed to emulate a hit, a human touch, a grip and/or any other touch on the hand that is dressed with the sleeve.

Optionally, the tactile machine-user interface device 10, 48, 58, is positioned as a layer above a screen, such as a touch screen. In such an embodiment, the tactile machine-user interface device 10, 48, 58, is made of transparent or substantially transparent materials. In such an embodiment, the topography may be based on the image that is presented on the screen. In such a manner, the user may receive a tactile emulation of a texture or a terrain that is presented on the screen.

Additionally or alternatively, according to some embodiments of the present invention, the device 10, 48, 58 is used as an optical layer having adjustable optical properties. In such an embodiment, the layer 18 optically changes the display of the screen, for example by changing the pattern of the surface of the layer 18. Optionally, the changes are performed by changing the topography of the layer 18 in one or more regions. The changes may be a deviation few micron in the height of the region in relation to another region and/or a micron level change in the curve or gradient of the region.

These changes affect the manner light from the screen is reflected and/or diverted. Optionally, the layer 18 may change the reflective properties of the screen, for example from anti-reflective and matte to shiny and reflective. Other properties of the display, for example brightness, may be changed by adjusting the topography of the layer. It should be noted that changing such optical properties may be performed in addition or as an alternative to the aforementioned tactile changes.

Optionally, the screen is a touch screen that displays an interface, such as a keypad. In such an embodiment, the tactile machine-user interface device 10, 48, 58 provides the user with a tactile sensation to the components of the displayed interface for example a tactile sensation of different buttons.

Optionally, the tactile machine-user interface device 10, 48, 58, used as an input device such as a keypad of a user device. Optionally, the input elements are the aforementioned pH sensors. In such an embodiment, the identifiers of the buttons of the keypad may be determined according to the topography of the layer, which is optionally defined as described above. In such an embodiment, the tactile presentation of the buttons may be dynamically changed, for example according to the application which executed on the user device. For instance if the user device is a cellular phone, the keypad may be changed from a dialing keypad to a keypad of a calculator application and/or a camera keypad and vice versa.

Optionally, the tactile machine-user interface device 10, 48, 58 comprises a network interface, or a connection to a computing unit that uses such a network interface, for allowing the controller 38 to receive the perceivable data from a remote client terminal or a network node. In such an embodiment, a three dimensional (3D) scan of an element by a first network node may be forwarded to the controller 38, allowing the device 10, 48, 58 to shape the topography of the layer 18, as described above, according to the received perceivable data. In such a manner, am element that is scanned by a 3D scanner that is used by the first network node may be physically emulated using the device 10 that is connected to or function as a second network node that receives the respective 3D scan.

It is expected that during the life of a patent maturing from this application many relevant systems and methods will be developed and the scope of the term a membrane, a pH sensor, a gel, and a controller is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", an and the include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Various embodiments and aspects of the present invention as delineated hereinabove and as claimed in the claims section below find experimental support in the following examples.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for a tactile presentation of perceivable content, comprising:
   receiving a data representing perceivable content;
   selecting a plurality of electric currents according to said data, each said electric current being associated with at least one of a plurality of regions of a solution having a plurality of macromolecules;
   measuring a level of acidity (pH) in each said at least one region and performing said changing; and
   changing said pH of at least one of said plurality of regions according to said measuring by applying a respective said electric current thereto;
   wherein a proton concentration in said plurality of regions tactilely presents said perceivable content.

2. The method of claim 1, wherein said changing comprises biasing a plurality of electrodes positioned in said solution for performing said changing.

3. The method of claim 1, wherein said perceivable content having a spatio temporal pattern; further comprising repeating said changing and tactilely presenting to emulate said temporal pattern.

4. The method of claim 1, wherein said changing is performed by changing a proton concentration in adjacent to said solution to induce an ion movement therefrom or thereto.

5. The method of claim 1, further comprising displaying said data behind said solution.

6. An apparatus for a tactile presentation of perceivable content, comprising:
   a layer having at least one pH dependent characteristic;

a controller configured for receiving a data representing perceivable content and selecting a plurality of electric currents according to said data; and a plurality of electrodes configured for changing a level of acidity (pH) in a plurality of regions of said layer by simultaneously applying said plurality of electric currents thereto;

a plurality of pH sensors each configured for measuring said pH in a respective of said plurality of regions;

wherein said controller being configured for adjusting said plurality of electric currents according to said plurality of pH sensors;

wherein said applying changes said at least one pH dependent characteristic in each said region so that said layer tactilely present said perceivable content.

7. The apparatus of claim 6, wherein each said electrode is individually controlled by said controller.

8. The apparatus of claim 6, wherein said layer comprises gel.

9. The apparatus of claim 6, wherein said layer and said array of electrodes are elastic.

10. The apparatus of claim 6, wherein said layer and said array of electrodes are sized and shaped according to be dressed on at least one human organ; said perceivable content being a tactile pattern applied on said at least one human organ to induce a tactile sensation.

11. The apparatus of claim 6, further comprising a plurality of flow sensors each configured for detecting a solution flow in a respective of said plurality of regions, said controller being configured for indicating a touch in said respective region in response to said detected solution flow.

12. The apparatus of claim 6, wherein said layer comprises at least one pH indicator configured for changing its color in each said region when a respective said pH being changed.

13. The apparatus of claim 6, wherein each said pH sensor is configured for detecting a pressure applied on a respective said region by performing said measuring.

14. The apparatus of claim 6, wherein said perceivable content is an indication received from an external device communication with said controller.

15. The apparatus of claim 6, wherein said controller convert said perceivable content to at least one embossment, said plurality of electric currents being selected according to said at least one embossment so that said layer tactilely present said at least one embossment.

16. The apparatus of claim 6, wherein said plurality of electrodes are arranged in a structure having a pattern selected from a group consisting of a convex pattern, a concave pattern, and a wavy pattern.

17. The apparatus of claim 6, further comprising a screen positioned below said layer and configured for displaying an image pertaining to said perceivable content.

18. The apparatus of claim 6, further comprising an input device positioned below said layer and configured for detecting a pressure applied on said layer during said tactile presentation.

19. An optical element for changing a display, comprising:
a layer having at least one pH dependent characteristic;
a controller configured for receiving a data representing a pattern and selecting a plurality of electric currents according to said data; and
a plurality of electrodes configured for changing a level of acidity (pH) in a plurality of regions of said layer by simultaneously applying said plurality of electric currents thereto;
a plurality of pH sensors each configure, for measuring said pH in a respective of said plurality of regions;
wherein said controller being configured for adjusting said plurality of electric currents according to said plurality of pH sensors:
wherein said applying changes said at least one pH dependent characteristic in each said region so that at least one optical property of said layer being changed.

* * * * *